US 9,477,966 B2

(12) United States Patent
Hewett et al.

(10) Patent No.: US 9,477,966 B2
(45) Date of Patent: Oct. 25, 2016

(54) ACCURATELY ESTIMATING THE AUDIENCE OF DIGITAL CONTENT

(75) Inventors: Edward L. Hewett, Crockett, TX (US); Eric V. Anderson, Bluffdale, UT (US); William Brandon George, Pleasant Grove, UT (US); Kevin G. Smith, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 112 days.

(21) Appl. No.: 13/335,611

(22) Filed: Dec. 22, 2011

(65) Prior Publication Data

US 2014/0244566 A1 Aug. 28, 2014

(51) Int. Cl.
| | |
|---|---|
| *G06N 7/02* | (2006.01) |
| *G06N 7/06* | (2006.01) |
| *G06Q 30/02* | (2012.01) |
| *G06N 7/04* | (2006.01) |
| *G06N 5/04* | (2006.01) |
| *G06N 99/00* | (2010.01) |
| *G06N 7/00* | (2006.01) |

(52) U.S. Cl.
CPC ............ *G06Q 30/0242* (2013.01); *G06N 5/04* (2013.01); *G06N 5/048* (2013.01); *G06N 7/005* (2013.01); *G06N 7/04* (2013.01); *G06N 99/005* (2013.01)

(58) Field of Classification Search
USPC .......................................................... 706/52
See application file for complete search history.

(56) References Cited

U.S. PATENT DOCUMENTS

| | | | |
|---|---|---|---|
| 6,961,766 B2 | 11/2005 | Janosik, Jr. et al. | |
| 7,260,837 B2 | 8/2007 | Abraham et al. | |
| 8,069,076 B2 * | 11/2011 | Oddo | 705/7.29 |
| 8,161,530 B2 * | 4/2012 | Meehan et al. | 726/4 |
| 8,250,070 B1 * | 8/2012 | He et al. | 707/727 |
| 2003/0105809 A1 * | 6/2003 | Yoshii et al. | 709/203 |
| 2010/0076274 A1 * | 3/2010 | Severson | 600/300 |
| 2012/0284807 A1 * | 11/2012 | Cowan, II | 726/30 |

OTHER PUBLICATIONS

Andrew Green, "Why are print audience figures different when I calculate them using different software?", Warc Media FAQ, London, Jun. 2006. pp. 1-2.
Peter Eckersley, "How Unique is Your Web Browser?", in Proceedings of the 10th international conference on Privacy enhancing technologies (PETS'10), May 2010. pp. 1-19 ( retrieved from https://panopticlick.eff.org/browser-uniqueness.pdf).

* cited by examiner

*Primary Examiner* — Kakali Chaki
*Assistant Examiner* — Ababacar Seck
(74) *Attorney, Agent, or Firm* — Kilpatrick Townsend & Stockton LLP

(57) ABSTRACT

A method, system, and computer-readable storage medium are disclosed for accurately estimating the audience of digital content. A plurality of user interactions occurring on a digital device are received, wherein digital content is displayed on the digital device. Based on the plurality of user interactions, a total number of unique viewers of the digital content on the digital device is estimated.

23 Claims, 5 Drawing Sheets

ACCURATELY ESTIMATING THE AUDIENCE OF DIGITAL CONTENT

BACKGROUND

In the field of traditional print publishing, publishers of magazines and other periodicals typically sell advertising based on an estimated "total audience" reached by a particular publication. The estimated total audience differs from the number of copies printed or sold because each copy may be accessed by multiple people during its lifespan. Therefore, to calculate the total audience, print publishers have historically relied on surveys or panels to estimate the number of people reached by a single copy of the publication. The estimated number of readers per copy is then extrapolated to the total circulation. For example, if a particular issue sells 100,000 copies, and if reader surveys find that a single copy reaches 2.1 people on average, then the total audience may be estimated to be 210,000 individuals. However, because of flaws inherent to the survey-based methodology that is used to collect reader information, the current audience calculations may be flawed and inaccurate measures of the true audience reached by a publication.

Many publishers are now creating digital editions of their traditional print publications. The digital editions are distributed through digital channels and read on digital devices (e.g., tablet devices, personal computers, e-readers, mobile phones, laptop computers, etc.). To measure the circulation of these digital editions, a cookie or device identifier associated with each digital reader may be passed to an analytic system along with usage information when the digital readers access digital content. Other measures of circulation may be based on the number of digital periodical copies sold to readers. However, while these existing measures may be effective at determining the total number of copies that are distributed, the existing measures do not provide the total audience of a digital magazine. In particular, the existing measures do not account for the possibility of multiple people accessing the same digital content on the same device.

For example, a household of three people may have a single tablet device that is shared by all members of the household. Digital magazine purchases delivered to the tablet device may be accessed by all three people within the household. Although the audience for the digital magazine may include all three people who access the digital edition on the tablet device, the existing measures of circulation would attribute all usage on a single device to a single user. Therefore, the existing measures would incorrectly increment the "circulation" or "unique users" metric by 1 instead of 3. Even the "fingerprinting" of browser software to identify unique instances may fail to provide an accurate measure of circulation when multiple people are sharing a unique instance of the browser. While the traditional method of using surveys and panels may be used instead of digital measures to calculate the true audience, the use of such surveys will be just as flawed and inaccurate for digital content as for print content. Without having an accurate measure of the true audience size of a digital publication, publishers may be unable to demonstrate the true value of their digital publication content to prospective advertisers.

SUMMARY

Various embodiments of systems, methods, and computer-readable storage media for accurately estimating the audience of digital content are disclosed. A plurality of user interactions occurring on a digital device may be received while a digital content is displayed on the digital device. For example, the user interactions may be received by a server over a network. Based on the plurality of user interactions, a total number of unique viewers of the digital content on the digital device may be estimated.

In one embodiment, each of the plurality of user interactions may be classified into a respective one of a plurality of usage factors, and a score may be assigned to each of the plurality of usage factors based on the plurality of user interactions. The plurality of usage factors may be determined based on the capabilities of the digital device. A weight may also be assigned to each of the plurality of usage factors. A plurality of behavioral fingerprints may then be determined based on the respective score and respective weight assigned to each of the plurality of usage factors. The total number of unique viewers of the digital content on the digital device may be estimated by determining the number of behavioral fingerprints found in the user interactions on the digital device.

In one embodiment, a particular viewer of the unique viewers may be assigned to a usage segment based on a similarity between the user interactions for the particular viewer and additional user interactions for additional viewers already assigned to the usage segment. In response to assigning the first viewer to the usage segment, the digital content on the digital device may be modified.

Figure 1:
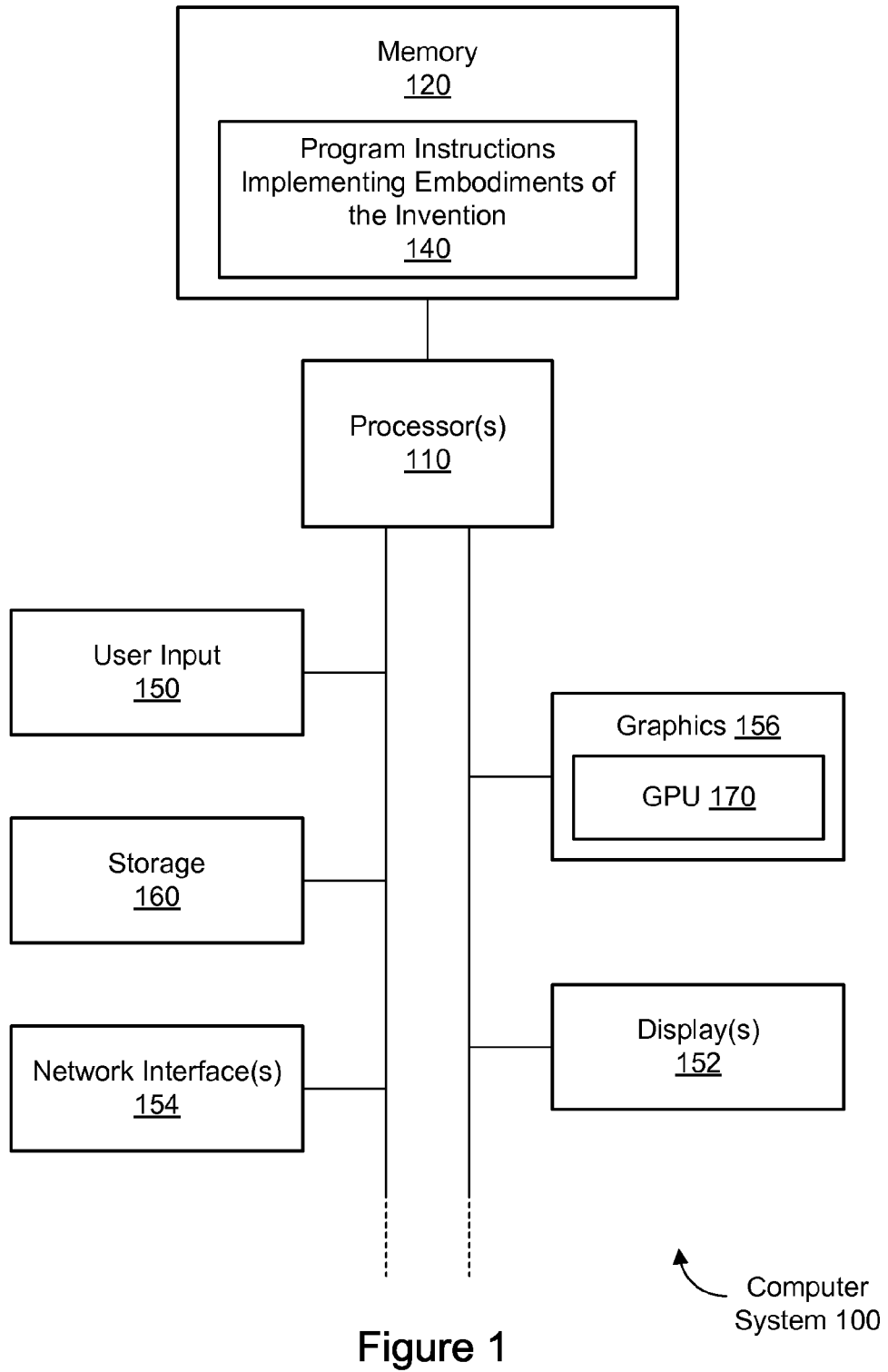
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used for accurately estimating the audience of digital content. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
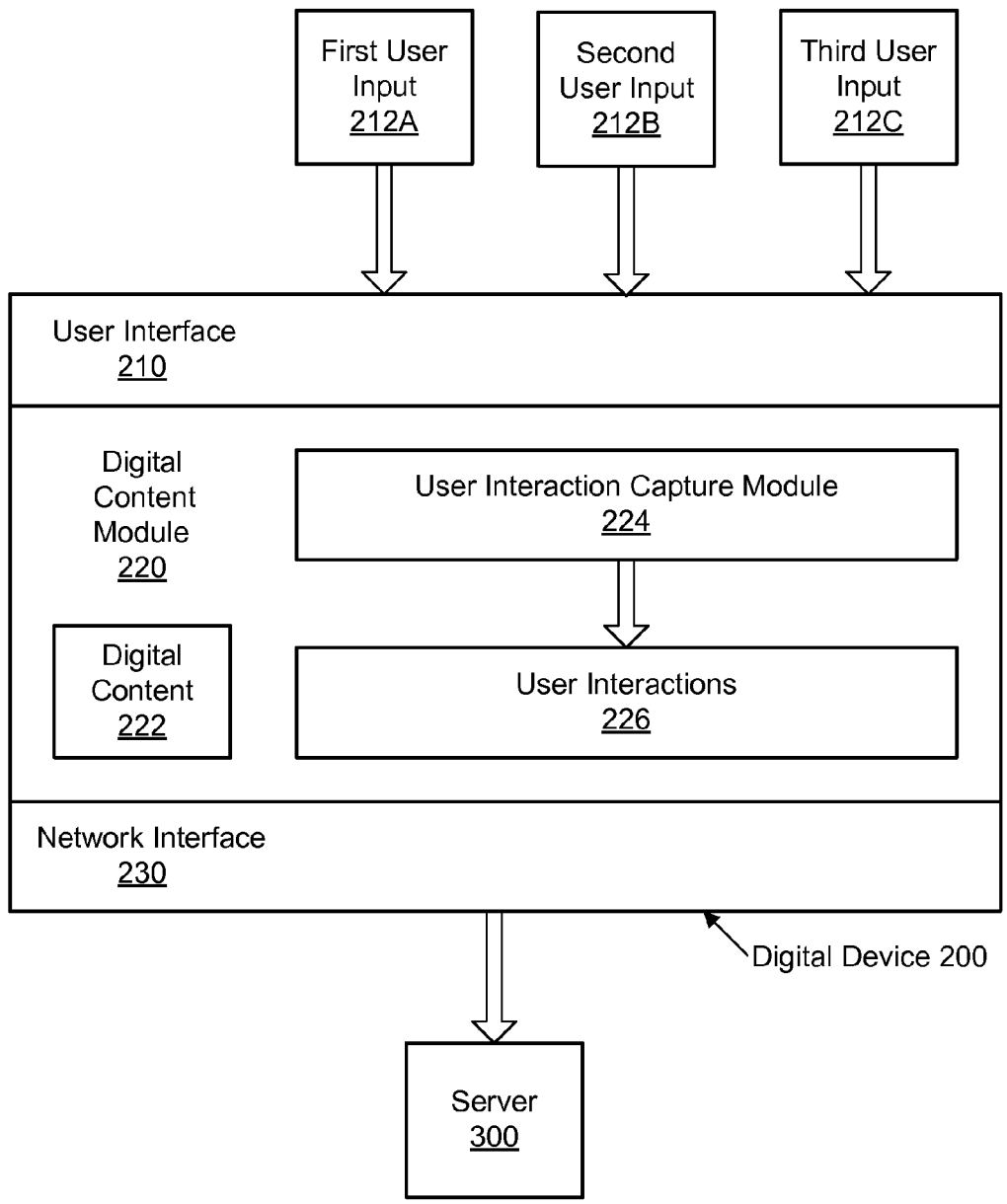
FIG. 2 illustrates an example of a digital device configured for accurately estimating the audience of digital content, according to one embodiment.

FIG. 2 illustrates an example of a digital device 200 configured for accurately estimating the audience of digital content, according to one embodiment. The digital device 200 may be implemented as a computer system 100 such as a tablet device, personal computer, e-reader, mobile phone, laptop computer, or any other suitable system. As used herein, "digital content" is a set of digital multimedia content that is displayed on a digital device 200. The digital content may comprise any combination of text, graphics, video, audio, games, interactive features, etc. For example, the digital content may comprise a digital publication, e.g., a digital edition of a magazine or other periodical. The digital content 222 may comprise interactive features that a viewer may access, activate, or modify using user interface capabilities of the digital device. As used herein, a "viewer" of digital content is a user who displays the digital content on a display device and/or interacts with the digital content using a digital device. When the digital content comprises a digital publication or other digital content containing text, the viewer may be referred to as a reader.

The usage of the digital device 200 may be measured using highly granular usage behaviors and/or metrics such as individual clicks in a graphical user interface (GUI), individual swipes in a GUI, timespent metrics, etc. Accordingly, the usage of the digital device 200 to read or access digital content 222 may be measured using behavioral inputs and/or associated metrics. As described herein, granular usage information associated with a piece of digital content may be measured accurately, and an analysis may then be performed to detect usage patterns of distinct individuals using the granular usage information. Once distinctive usage patterns are identified, users may be differentiated. For example, the audience for digital content may be estimated accurately.

As used herein, the "circulation" of a digital publication indicates the number of copies of the digital publication that are distributed to digital devices. As used herein, the "audience" of a digital publication or digital content indicates the number of unique, individual people who view or otherwise access the digital publication. The accurate estimate determined as described herein may permit publishers and advertisers to understand the true audience of a digital publication or digital content and not merely its circulation. Publishers may sell advertising for their digital publications or digital content using this accurate estimate of the audience rather than a flawed estimate generated using existing measures. Additionally, digital content producers may use the information captured in generating the accurate estimate to separate usage patterns for different users in order to provide a better content experience that is customized for individual viewers.

The digital device 200 may comprise a digital content module 220 which is configured to display the digital content 222. In one embodiment, the digital content module 220 is configured to respond to user input regarding the digital content 222, such as by modifying the digital content 222 for display on the digital device 200. In one embodiment, the digital content module 220 is configured to present one or more interactive features of the digital content 222. The digital content 222 may comprise program instructions which the digital content module 220 may be configured to execute or interpret.

In one embodiment, when users access digital content on a digital device, detailed information about the user interactions with the digital content is collected. The digital device 200 may comprise a user interface 210 for receiving user input, including user input to access, read, direct, control, and/or interact with the digital content 222. The user interface 210 may include a graphical user interface (GUI). As shown in the example of FIG. 2, three sets of user input are collected: a first set of user input 212A, a second set of user input 212B, and a third set of user input 212C. It is contemplated that different amounts and combinations of user input may be received or collected in various embodiments. The user input 212A, 212B, and 212C may be received at the digital device while the digital content is displayed on the digital device. Each set of user input may be received during a different window in time. For example, the first set of user input 212A may be received during a first window in time, the second set of user input 212B may be received during a second window in time, and the third set of user input 212C may be received during a third window in time.

The user input 212A, 212B, and 212C may relate to a plurality of user interactions with the digital device 200. As shown in FIG. 2, a user interaction capture module 224 may capture the user interactions 226 based on the user input 212A, 212B, and 212C. For example, the user interaction capture module 224 may observe the interaction of the user with the digital content 222 and/or digital device 200 and optionally capture user preferences and other environmental data suitable for identifying a usage pattern. In various embodiments, the user interaction data may be captured on the digital device using any suitable software and hardware. In one embodiment, the user interaction capture module 224 may include or be in communication with operating system software present on the digital device. The operating system software of a digital device may typically permit the capture of instances of user interaction with various user interface elements. In one embodiment, the user interaction capture module 224 may capture events generated by the operating system software. In one embodiment, the user interaction capture module 224 may include custom software used for accessing or reading a particular digital content. For example, the user interaction capture module 224 may comprise a plug-in module or other set of program code that is embedded in the same application that provides the digital content 222. In one embodiment, the user interaction capture module 224 may implement one or more Application Programming Interfaces (APIs) which enable the digital content 222 to request the capture of the user interactions 226. In one embodiment, the process performed by the user interaction capture module 204 may be performed automatically and/or programmatically.

The captured user interactions 226 may be sent from the digital device 200 to a server 300 for analysis of the user interactions 226. In one embodiment, the user interactions 226 may be sent to the server 300 over a network interface 230 linking the digital device 200 to a network. The network interface may permit the digital device 200 and server 300 to communicate over any suitable wireless network and/or wired network, including the Internet. In one embodiment, the user interactions 226 may be sent to the server 300 as soon as they are captured (i.e., substantially in real time). In one embodiment, the user interactions 226 may instead be sent to the server 300 in bundles. A bundle may be sent to the server 300 after a suitable amount of user interactions 226 have been captured and/or after a suitable time has lapsed since a previous bundle was sent to the server 300.

Figure 3:
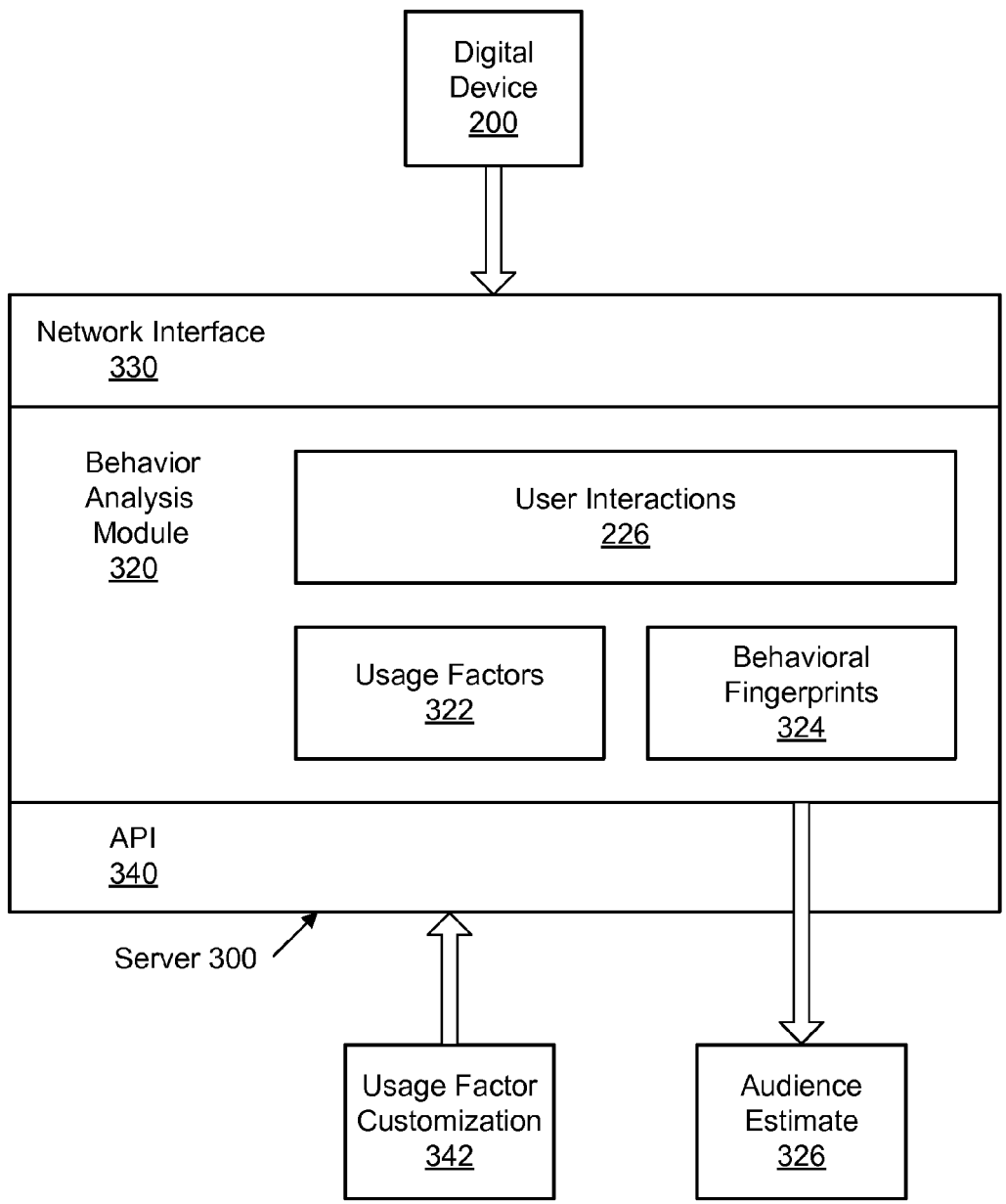
FIG. 3 illustrates an example of an analysis module configured for accurately estimating the audience of digital content, according to one embodiment.

FIG. 3 illustrates an example of a server 300 that may implement embodiments of methods for accurately estimating the audience of digital content. The server may receive the user interactions 226 from the digital device 200. In one embodiment, the user interactions 226 may be received by the server 300 over a network interface 330 linking the server 300 to the network.

The server may comprise a behavior analysis module 320 configured to analyze the user interactions 226 with the digital content 222 on the digital device 200. Each of the user interactions may belong to one of a plurality of usage factors 322. Each usage factor 322 may comprise one or more types of interaction with the digital device 200 and/or digital content 222. For example, one usage factor may include aspects of touch-screen usage. As will be described in greater detail below, the behavior analysis module 320 may analyze the user interactions 226 and usage factors 322 to generate one or more behavioral fingerprints 324. For example, the first set of user input 212A may be identified as belonging to a first behavioral fingerprint, the second set of user input 212B may be identified as belonging to a second behavioral fingerprint, and the third set of user input 212C may be identified as belonging to a third behavioral fingerprint. Alternatively, two or more of the various sets of user input 212A, 212B, and 212C may belong to the same behavioral fingerprint. Each usage factor may be scored and weighted to identify the one or more behavioral fingerprints 324 in the user interactions 226. Each of the behavioral fingerprints 324 may comprise a pattern of user interaction with the digital content 222 on the digital device 200. Each pattern of user interaction may uniquely identify a particular viewer of the digital content 222 on the digital device 200. The behavioral fingerprints 324 may include usage patterns but exclude the real names and other personal data of viewers.

The behavior analysis module 320 may output an audience estimate 326 based on the behavioral fingerprints 324. The audience estimate 326 may comprise an estimate of the number of unique, individual people who have read or otherwise accessed the digital content 222 on the digital device 200. For example, the audience estimate may equal the number of behavioral fingerprints associated with the digital content 222 on the digital device 200. In one embodiment, the audience estimate 326 may comprise an estimate of the total number of unique, individual people who have read or otherwise accessed the digital content 222 across a plurality of digital devices.

In one embodiment, the role of the server 300 may be reduced or eliminated, and aspects of the behavioral analysis may instead be performed on the digital device 200. For example, the identification of the behavioral fingerprints 324 may be performed on the digital device 200, and the server 300 may determine the total number of unique viewers across all devices.

In one embodiment, an Application Programming Interface (API) 340 may permit customization 342 of aspects of the usage factors 322. In one embodiment, for example, the usage factors 322 may be customized to add or remove particular ones of the usage factors 322 from the behavior analysis. In one embodiment, the usage factors 322 may be customized to modify a weight associated with a particular one of the usage factors. In one embodiment, the process performed by the behavior analysis module 320 may be performed automatically and/or programmatically.

Figure 4:
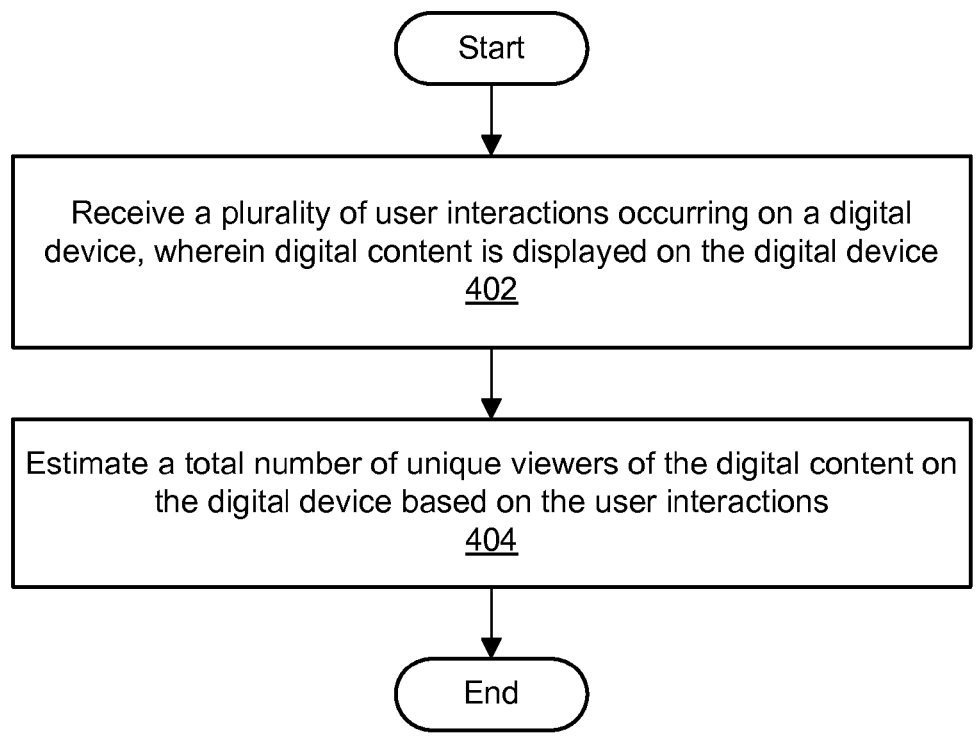
FIG. 4 is a flowchart illustrating a method for accurately estimating the audience of digital content, according to one embodiment.

FIG. 4 is a flowchart illustrating a method for accurately estimating the audience of digital content, according to one embodiment. The method shown in FIG. 4 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 402, a plurality of user interactions occurring on a digital device may be received while digital content is displayed on the digital device. In one embodiment, the user interaction data may be sent from the digital device to a separate server for analysis. As shown in block 404, a total number of unique viewers of the digital content on the digital device may be estimated based on the plurality of user interactions. The sum of all the collected interactions by a particular user with the different factors may be used to determine a behavioral fingerprint that is unique to that particular user on that particular device. Based on the user behavioral fingerprints, the analysis server may determine a number of unique viewers of the digital content for the device. The number of unique viewers across all devices may be aggregated to determine an accurate estimate of the audience for the digital content.

Figure 5:
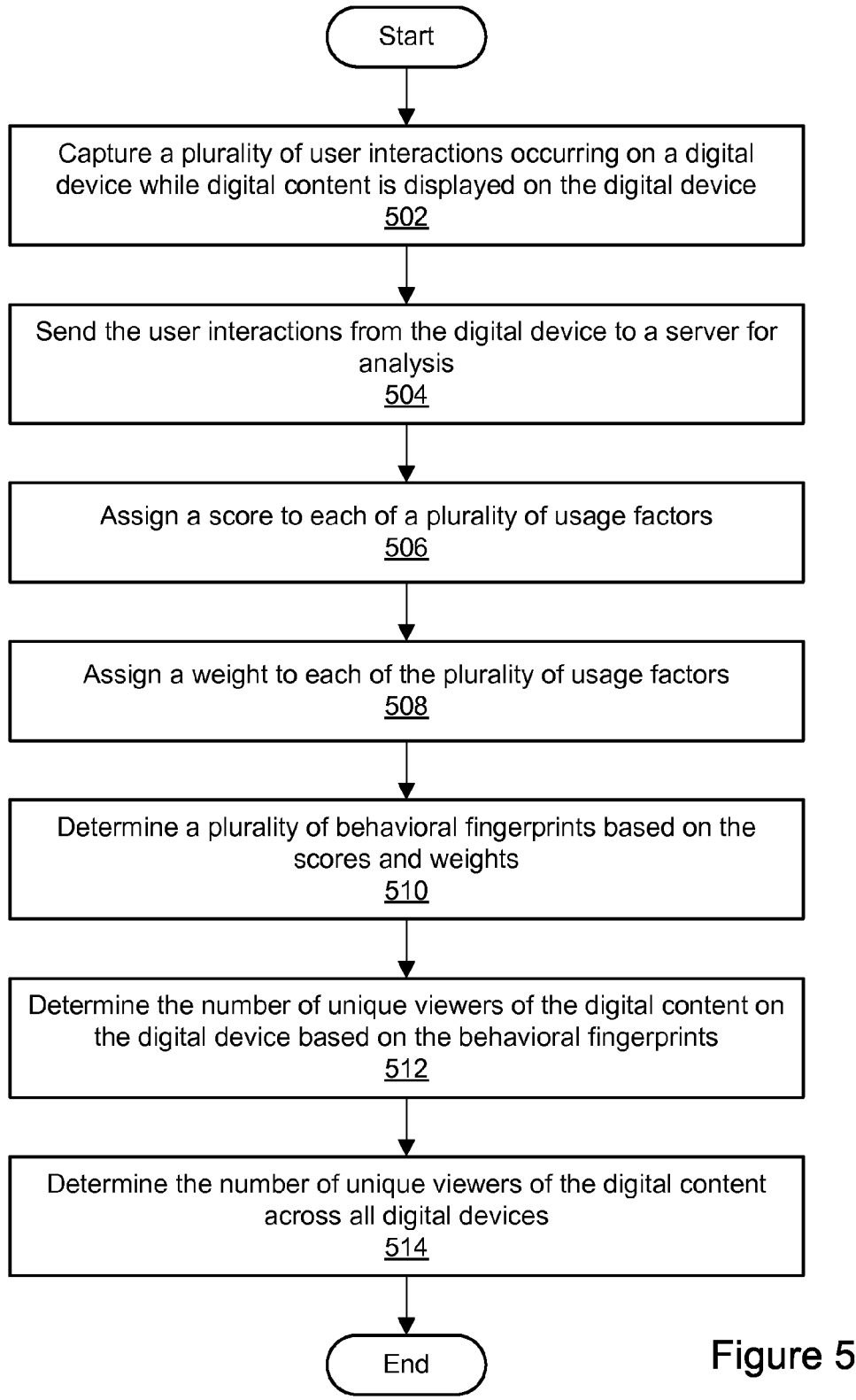
FIG. 5 is a flowchart illustrating further aspects of a method for accurately estimating the audience of digital content, according to one embodiment.

FIG. 5 is a flowchart illustrating further aspects of a method for accurately estimating the audience of digital content, according to one embodiment. The method shown in FIG. 5 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 502, a plurality of user interactions 226 occurring on a digital device 200 may be captured on the digital device. The user interactions 226 may be captured while digital content 222 is displayed on the digital device, and the user interactions 226 may relate to usage of the digital content 222. As shown in block 504, the user interactions may be sent from the digital device to a server over a network. As shown in blocks 506-514, analysis of the user interactions may be performed on the server. Alternatively, the user interactions may be analyzed on the digital device itself.

The data collected regarding user interactions 226 may include data belonging to a plurality of usage factors 322. The usage factors 322 may include various types of user behavior and user preferences. In various embodiments, different combinations of usage factors 322 may be used. The inclusion of more usage factors in the analysis may produce a more accurate count of unique viewers. Similarly, the inclusion of more user interaction data collected over time may also produce a more accurate differentiation of viewers. However, the inclusion of more usage factors or more data may also increase the processing cost of analyzing the factors.

In one embodiment, the usage of "next" and "previous" navigation elements may be captured as one or more of the usage factors. In one embodiment, user interactions with a touch-screen, including gesture-based interactions, such as swiping patterns, speed/velocity of touch, and thickness of touch, may be captured as one or more of the usage factors. In one embodiment, user interactions with interactive elements within digital content (e.g., tools, images, video) may be captured as one or more of the usage factors. In one embodiment, the orientation of the digital device (e.g., landscape or portrait) and changes thereof may be captured as one or more of the usage factors. In one embodiment, the amount of "static" device movement may be captured as one or more of the usage factors. In one embodiment, the angle of the digital device may be captured as one or more of the usage factors. In one embodiment, non-standard user interactions (e.g., pulling an image off screen and releasing, doodling on the page, etc.) may be captured as one or more of the usage factors. In one embodiment, commands to zoom in and out (e.g., double tap vs. multi-touch drag in and out) may be captured as one or more of the usage factors. In one embodiment, double-tap speed may be captured as one or more of the usage factors. In one embodiment, a "timespent" metric indicating the time spent on one page or element of digital content may be captured as one or more of the usage factors. In one embodiment, an identifier unique to the device (e.g., a cookie, device identifier, etc.) may be captured as one or more of the usage factors. In embodiments where mouse input is received, the usage factors may include mouse-specific attributes such as double-click speed, drag speed, and scrolling behavior.

Once the usage factors have been collected, each usage factor may be scored and weighted for its importance or relevance in determining unique user patterns. Each of the plurality of user interactions may be classified into a respective one of a plurality of usage factors. The plurality of usage factors may be determined based on the capabilities of the digital device. As shown in block 506, a score may be assigned to each of a plurality of usage factors based on the plurality of user interactions. For example, score for a particular usage factor may be based on the number of times (if any) a user interacted with the particular usage factor. As shown in block 508, a weight may be assigned to each of the plurality of usage factors. The weight may indicate the importance or relevance of each usage factor in determining a behavioral fingerprint of a viewer. For example, the angle (or range of angles) at which a viewer holds a tablet device or e-reader may be assigned a high weight if such a usage pattern tends to identify one viewer from another on a particular device. In one embodiment, a higher weight may be assigned to a usage factor based on the number of times an action belonging to the factor was observed from a user. The weights may be default weights, custom weights, or any combination thereof. In one embodiment, all the usage factors may be equally weighted. In one embodiment, the operation shown in block 508 may generate a weighted score for each usage factor.

The factors used in determining unique viewers may change based on the capabilities of a particular digital device. For example, the usage of the factors may be modified based on whether the device has a touch-screen, whether the device has a multi-touch interface, whether the device is capable of measuring its orientation or angle, etc. The touch-based factors used for behavioral fingerprinting may comprise any suitable user behaviors utilizing the touch-screen capabilities of a digital device. In one embodiment, the usage of a single factor may be scored. In one embodiment, the level of accuracy associated with the unique viewers on the device may also be determined.

As shown in block 510, a plurality of behavioral fingerprints 324 may be determined based on the respective score and respective weight assigned to each of the plurality of usage factors. A behavioral fingerprint may comprise a usage pattern or model that distinguishes one user from other users on the digital device 200. For example, a particular user may use landscape orientation 70% of the time, average fifteen "ambient" or static motions per minute, average a fifteen degree tilt while reading, double-tap to zoom in 80% of the time, have a very fast swiping speed, and doodle circles with their finger on a gesture-based interface of a touch-screen device while reading. All of these factors combined with the weight and score of each factor may be used to identify the user as unique from other users interacting with the device. The model associated with a behavioral fingerprint may be strengthened as more user interactions are captured. In one embodiment, a behavioral fingerprint may model the interaction of a user with a plurality of different instances and/or types of digital content on the same digital device.

In one embodiment, the user interactions occurring during a particular window of time may be associated with a particular user. As described above, a model corresponding to a behavioral fingerprint may be generated for the particular user. Future user interactions may be compared to the existing behavioral fingerprint to determine whether the future user interactions fit the same usage pattern. If the future user interactions do not fit the same usage pattern (e.g., based on the scoring and weighting of the usage factors), then a new behavioral fingerprint may be generated. In one embodiment, an apparent transfer of the digital device from a first user to a second user (e.g., on a tablet device or e-reader including an accelerometer) may be used to close a window of time associated with the first user and open a new window of time associated with the second user.

As shown in block 512, the total number of unique viewers of the digital content on the digital device may be estimated based on the number of behavioral fingerprints found in the user interactions on the digital device. As shown in block 514, the number of unique viewers estimated for the digital device may be aggregated with the number of unique viewers for a plurality of additional digital devices to obtain a total number of unique viewers for the digital content.

In one embodiment, the set of behaviors analyzed for uniqueness may be restricted to behaviors captured on a single device. Accordingly, to determine the number of unique viewers on a particular digital device, only the behaviors associated with that device may be considered. A digital device may be distinguished from other devices by its unique identifier (e.g., a cookie, device identifier, etc.). Limiting the set of interactions to include only the interactions on a single unique device may significantly improve the accuracy of the resulting report indicating the number of viewers on the device. Alternatively, the set of user interactions from a plurality of digital devices may be analyzed to generate a plurality of behavioral fingerprints.

Additionally, the number of viewers may be reported for each digital device. For example, the analysis may find that three unique people accessed the digital content on a first device. For a second device, the analysis may find that four people accessed the same digital content. The analysis may yield a report showing a total audience of seven viewers across two devices.

In one embodiment, an Application Programming Interface (API) may be provided for modifying aspects of the accurate audience estimation. In one embodiment, the API may be used to add or remove usage factors from the collection and analysis. In one embodiment, the API may be used to change the weighting or importance assigned to specific factors. For example, a publisher may desire to measure interaction with an interactive element of a particular piece of digital content and then assign a high weight for distinctive usage patterns on that particular factor. In this case, the API may provide a mechanism to collect usage information about the additional interactions and assign a high weight to unique behaviors associated with the interactive element.

In addition to uniquely identifying viewers on a device, distinctive usage patterns may be grouped to assign viewers with a particular usage pattern into a group or segment of similar viewers. The groups or segments may be referred to as behavioral segments or usage segments. For example, viewers who double tap to zoom more frequently than pinching to zoom may be assigned to a double tapper segment. As another example, users with high velocity swiping patterns may be grouped together in another segment for analysis. Once viewers have been segmented in this manner, digital content may be customized for distinctive usage patterns. For example, the viewers in a high-velocity swiper segment may receive additional navigational elements to help them navigate quickly. As another example, users with a "first reader" usage pattern could receive a tutorial or other navigational prompts to help them navigate through the digital content. In this manner, the digital content may be configured based on the apparent proficiency of the user.

Distinctive usage profiles may also be compared to usage profiles of known segments (e.g., age, gender, etc.). Usage profiles that are statistically similar between the known and unknown segments may be grouped. For example, if a group of known users share a distinctive "static" device movement or tilt pattern, such a pattern could be compared with the algorithm scores of the unknown users. Those unknown users matching the distinctive known usage pattern could be assigned to the same segment. In one embodiment, unknown users may be compared to behavioral touch-based segments or fingerprints from known segments in order to assign the unknown users to a relevant segment.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method of estimating a total number of unique viewers of a digital publication, the method comprising:
    at a computer, receiving, from each digital device of a plurality of digital devices, data regarding a plurality of user interactions with a digital publication on the digital device,
        wherein the user interactions comprise usage factors collected while the digital publication is displayed on the digital device, and wherein the usage factors comprise at least one of: orientation of the digital device, movement of the digital device or angle of the digital device,
        wherein at least some of the digital devices are shared devices, each shared device shared by a plurality of users who are undifferentiated by the shared digital device, and
        wherein the data regarding the user interactions excludes personal data of the plurality of users;
    with the computer, analyzing the data received from each digital device to determine at least one distinctive behavioral fingerprint for the digital device, each distinctive behavioral fingerprint comprising a pattern of user interactions with the digital publication on the digital device, wherein for each shared device, the computer determines a plurality of distinctive behavioral fingerprints to differentiate the plurality of users by:
        analyzing a first set of user interactions collected by a first shared digital device during a first window of time,
        determining, based on the analysis of the first set of user interactions, a first distinctive behavioral fingerprint,
        analyzing a second set of user interactions collected by the first shared digital device during a second window of time,
        determining, based on the analysis of the second set of user interactions, a second distinctive behavioral fingerprint, the second behavioral fingerprint distinct from the first behavioral fingerprint, and
        differentiating a first user from a second user based on the first behavioral fingerprint and the second behavioral fingerprint;
    with the computer, associating each distinctive behavioral fingerprint with a different unique viewer; and
    with the computer, generating an estimate of a total number of unique viewers of the digital publication, wherein the generated estimate equals the number of distinctive behavioral fingerprints determined across all of the digital devices.

2. The method as recited in claim 1, wherein determining the at least one distinctive behavioral fingerprint comprises:
    assigning a score to each of the usage factors based on each of the user interactions, wherein each of the user interactions is classified into a respective one of the usage factors;
    assigning a weight to each of the usage factors; and
    determining a particular behavioral fingerprint based on the respective score and respective weight assigned to each of the usage factors.

3. The method as recited in claim 1, wherein determining the at least one distinctive behavioral fingerprint comprises:
    assigning a score to each of the usage factors based on each of the user interactions, wherein each of the user interactions is classified into a respective one of the usage factors; and
    determining a particular behavioral fingerprint based on the respective score assigned to each of the usage factors.

4. The method as recited in claim 1, wherein the patterns of user interactions comprise user interactions with a touch-screen display device.

5. The method as recited in claim 4, wherein the user interactions with a touch-screen display device comprise at least one of gesture-based interactions, tap-based interactions, changes to the orientation of the digital device, changes to the angle of the digital device, device movement as captured by an accelerometer, and non-standard user interactions.

6. The method as recited in claim 1, wherein the user interactions comprise at least one additional usage factor, and at least one of the additional usage factors is determined based on capabilities of the digital device.

7. The method as recited in claim 1, further comprising:
    identifying corresponding distinctive behavioral fingerprints occurring across two or more of the plurality of digital devices;
    grouping the corresponding distinctive behavioral fingerprints into a usage segment to identify similar types of viewers; and
    assigning each viewer associated with one of the corresponding distinctive behavioral fingerprints to the usage segment.

8. The method as recited in claim 7, further comprising:
    customizing digital content to be distributed to each digital device used by a viewer assigned to the usage segment.

9. A system, comprising:
    at least one processor; and
    a memory coupled to the at least one processor, wherein the memory stores program instructions, wherein the program instructions are executable by the at least one processor to:
    receive, from each digital device of a plurality of digital devices, data regarding a plurality of user interactions with a digital publication on the digital device,
        wherein the user interactions comprise usage factors collected while the digital publication is displayed on the digital device, and wherein the usage factors comprise at least one of: orientation of the digital device, movement of the digital device or angle of the digital device,
        wherein at least some of the digital devices are shared devices, each shared device shared by a plurality of users who are undifferentiated by the shared digital device, and
        wherein the data regarding the user interactions excludes personal data of the plurality of users;

analyze the data received from each digital device to determine at least one distinctive behavioral fingerprint comprising a pattern of user interactions with the digital publication on the digital device, wherein for each shared device, the computer determines a plurality of distinctive behavioral fingerprints to differentiate the plurality of users by:
  analyzing a first set of user interactions collected by a first shared digital device during a first window of time,
  determining, based on the analysis of the first set of user interactions, a first distinctive behavioral fingerprint,
  analyzing a second set of user interactions collected by the first shared digital device during a second window of time,
  determining, based on the analysis of the second set of user interactions, a second distinctive behavioral fingerprint, the second behavioral fingerprint distinct from the first behavioral fingerprint, and
  differentiating a first user from a second user based on the first behavioral fingerprint and the second behavioral fingerprint;
associate each distinctive behavioral fingerprint with a different unique viewer; and
generate an estimate of a total number of unique viewers of the digital publication, wherein the generated estimate equals the sum of the distinctive behavioral fingerprints determined across all of the digital devices.

10. The system as recited in claim 9, wherein determining the at least one distinctive behavioral fingerprint comprises:
  assigning a score to each of the usage factors based on each of the user interactions, wherein each of the user interactions is classified into a respective one of the usage factors;
  assigning a weight to each of the usage factors; and
  determining a particular behavioral fingerprint based on the respective score and respective weight assigned to each of the usage factors.

11. The system as recited in claim 9, wherein determining the at least one distinctive behavioral fingerprint comprises:
  assigning a score to each of the usage factors based on each of the user interactions, wherein each of the user interactions is classified into a respective one of the usage factors; and
  determine a particular behavioral fingerprint based on the respective score assigned to each of the usage factors.

12. The system as recited in claim 9, wherein the patterns of user interactions comprise user interactions with a touch-screen display device.

13. The method as recited in claim 12, wherein the user interactions with a touch-screen display device comprise at least one of gesture-based interactions, tap-based interactions, changes to the orientation of the digital device, changes to the angle of the digital device, device movement as captured by an accelerometer, and non-standard user interactions.

14. The system as recited in claim 9, wherein the user interactions comprise at least one additional usage factor, and at least one of the additional usage factors is determined based on capabilities of the digital device.

15. The system as recited in claim 9, wherein the program instructions are further executable by the at least one processor to:
  identify corresponding distinctive behavioral fingerprints occurring across two or more of the plurality of digital devices;
  group the corresponding distinctive behavioral fingerprints into a usage segment to identify similar types of viewers; and
  assign each viewer associated with one of the corresponding distinctive behavioral fingerprints to the usage segment.

16. The system as recited in claim 15, wherein the program instructions are further executable by the at least one processor to:
  customize digital content to be distributed to each digital device used by a viewer assigned to the usage segment.

17. A non-transitory computer-readable storage medium storing program instructions computer-executable to perform:
  receiving, from each digital device of a plurality of digital devices, data regarding a plurality of user interactions with a digital publication on the digital device,
    wherein the user interactions comprise usage factors collected while the digital publication is displayed on the digital device, and wherein the usage factors comprise at least one of: orientation of the digital device, movement of the digital device or angle of the digital device,
    wherein at least some of the digital devices are shared devices, each shared device shared by a plurality of users who are undifferentiated by the shared digital device, and
    wherein the data regarding the user interactions excludes personal data of the plurality of users;
  analyzing the data received from each digital device to determine at least one distinctive behavioral fingerprint comprising a pattern of user interactions with the digital publication on the digital device, wherein for each shared device, the computer determines a plurality of distinctive behavioral fingerprints to differentiate the plurality of users by:
    analyzing a first set of user interactions collected by a first shared digital device during a first window of time,
    determining, based on the analysis of the first set of user interactions, a first distinctive behavioral fingerprint,
    analyzing a second set of user interactions collected by the first shared digital device during a second window of time,
    determining, based on the analysis of the second set of user interactions, a second distinctive behavioral fingerprint, the second behavioral fingerprint distinct from the first behavioral fingerprint, and
    differentiating a first user from a second user based on the first behavioral fingerprint and the second behavioral fingerprint;
  associating each distinctive behavioral fingerprint with a different unique viewer; and
  generating an estimate of a total number of unique viewers of the digital publication, wherein the generated estimate equals the number of distinctive behavioral fingerprints determined across all of the digital devices.

18. The computer-readable storage medium as recited in claim 17, wherein determining the at least one distinctive behavioral fingerprint comprises:
  assigning a score to each of the usage factors based on each of the user interactions, wherein each of the user interactions is classified into a respective one of the usage factors;
  assigning a weight to each of the usage factors; and determining a particular behavioral fingerprint based on the respective score and respective weight assigned to each of the usage factors.

19. The computer-readable storage medium as recited in claim 17, wherein the patterns of user interactions comprise user interactions with a touch-screen display device.

20. The method as recited in claim 19, wherein the user interactions with a touch-screen display device comprise at least one of gesture-based interactions, tap-based interactions, changes to the orientation of the digital device, changes to the angle of the digital device, device movement as captured by an accelerometer, and non-standard user interactions.

21. The computer-readable storage medium as recited in claim 17, wherein the user interactions comprise at least one additional usage factor, and at least one of the additional usage factors is determined based on capabilities of the digital device.

22. The computer-readable storage medium as recited in claim 17, wherein the program instructions are further computer-executable to perform:
   identifying corresponding distinctive behavioral fingerprints occurring across two or more of the plurality of digital devices; and
   grouping the corresponding distinctive behavioral fingerprints into a usage segment to identify similar types of viewers; and
   assigning each viewer associated with one of the corresponding distinctive behavioral fingerprints to the usage segment.

23. The computer-readable storage medium as recited in claim 17, wherein the program instructions are further computer-executable to perform:
   customizing digital content to be distributed to each digital device used by a viewer assigned to the usage segment.

\* \* \* \* \*